(12) United States Patent
Radcliffe et al.

(10) Patent No.: US 6,627,161 B1
(45) Date of Patent: Sep. 30, 2003

(54) HORIZONTAL FCC FEED INJECTION AND DISTRIBUTOR

(75) Inventors: William H. Radcliffe, Prospect Heights, IL (US); Brian W. Hedrick, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/421,143

(22) Filed: Oct. 19, 1999

Related U.S. Application Data (62) Division of application No. 08/985,991, filed on Dec. 5, 1997, now Pat. No. 6,042,717.

(51) Int. Cl.[7] .............................. B01J 8/00; B01J 8/08; B01J 8/18
(52) U.S. Cl. ...................... 422/139; 422/140; 422/145; 422/194; 422/234
(58) Field of Search ................................ 422/139, 140, 422/145, 234, 188, 194

(56) References Cited

U.S. PATENT DOCUMENTS

| 3,071,540 A | 1/1963 | McMahon et al. ........... 208/163 |
| 4,427,538 A | 1/1984 | Bartholic .................... 208/127 |
| 4,427,539 A | 1/1984 | Busch et al. ................. 208/127 |
| 4,434,049 A | 2/1984 | Dean et al. .................. 208/153 |
| 4,479,870 A | 10/1984 | Hammershaimb et al. .. 208/164 |
| 5,139,748 A | 8/1992 | Lomas et al. ................ 422/140 |
| 5,205,992 A | 4/1993 | van Ommen et al. ........ 422/140 |
| 5,289,976 A * | 3/1994 | Dou et al. .................... 239/431 |
| 5,338,438 A | 8/1994 | Demoulin et al. ........... 208/153 |
| 5,358,632 A | 10/1994 | Hedrick ....................... 208/163 |
| 5,552,119 A | 9/1996 | Holmes ........................ 422/144 |
| 5,562,818 A | 10/1996 | Hedrick ....................... 208/163 |

* cited by examiner

Primary Examiner—Jerry D. Johnson
Assistant Examiner—Alexa Ann Doroshenk
(74) Attorney, Agent, or Firm—John G. Tolomei; James C. Paschall (57) ABSTRACT

An FCC feed injection arrangement injects feed transversely from the sides of a restricted opening into a stream of FCC catalyst to provide good feed and catalyst contacting in an arrangement that simplifies external pipe configurations and maintenance of the feed injection system. The invention forms a venturi or restricted opening by forming a generally square opening between two parallel extended chords on opposite sides of the riser. A venturi area may be built out of refractory lining or other abrasion-resistant structures. The invention may use horizontally extended pipes that are tangentially positioned apart from each other across from the restricted opening to provide a simple construction for the feed injection arrangement. The pipes are easily inserted and withdrawn from the riser to permit easy maintenance of the nozzles in the highly erosive environment. Insertable pipe distributors for distributing feed may be arranged to provide good overall distribution while also providing cooling to the outer surface of the distribution conduit to prevent coking. The distribution conduit may also be arranged to provide mixing of oil and steam near the injection point of the nozzles.

12 Claims, 4 Drawing Sheets

HORIZONTAL FCC FEED INJECTION AND DISTRIBUTOR

CROSS-REFERENCE TO RELATED APPLICATION

This application is a Divisional application of Ser. No. 08/985,991 filed Dec. 5, 1997, now U.S. Pat. No. 6,042,717, the contents of which are hereby incorporated by reference.

BACKGROUND OF THE INVENTION

1. Field of the Invention

This invention relates generally to the dispersing of liquids into fluidized solids. More specifically, this invention relates to a method and apparatus for dispersing a hydrocarbon feed into a transversely flowing stream of fluidized catalyst particles.

2. Description of the Prior Art

There are a number of continuous cyclical processes employing fluidized solid techniques in which carbonaceous materials are deposited on the solids in a contacting zone and the solids are conveyed during the course of the cycle to another zone where carbon deposits are at least partially removed by combustion in an oxygen-containing medium. The solids from the latter zone are subsequently withdrawn and reintroduced in whole or in part to the contacting zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

It has been found that the method of contacting the feedstock with the solids can dramatically affect the performance of the contacting zone. Ideally, the feed is instantaneously dispersed as it enters the riser over the entire cross-section of a stream of solids that is moving up the riser. A complete and instantaneous dispersal of feed across the entire cross-section of the riser is not possible, but good results have been obtained by injecting a highly atomized feed into a pre-accelerated stream of particles. However, the dispersing of the feed throughout the particles takes some time so that there is some non-uniform contact between the feed and particles as previously described. Non-uniform contacting of the feed and the particles, for the time it is in the axial contact zone, exposes portions of the feed to the particles for longer periods of time which in turn can produce overcracking and reduce the quality of reaction products.

It has been a long recognized objective in the FCC process to maximize the dispersal of the hydrocarbon feed into the particulate catalyst suspension. Dividing the feed into small droplets improves dispersion of the feed by increasing the interaction between the liquid and solid. It is well known that agitation or shearing can atomize a liquid hydrocarbon feed into fine droplets which are then directed at the fluidized solid particles. It is believed that as droplet sizes become small enough, they can completely vaporize before contacting the solids. However, it is also known that the improvements in dispersal and vaporization must be balanced against the smaller momentum and decrease in penetration across the catalyst stream that results as feed droplets become smaller. A variety of methods are known for shearing such liquid streams into fine droplets.

U.S. Pat. No. 3,071,540 (McMahon et al) discloses a feed injection apparatus for an FCC unit wherein a high velocity stream of gas, in this case steam, converges around the stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles. U.S. Pat. No. 4,434,049 (Dean et al) shows a device for injecting a fine dispersion of oil droplets into a fluidized catalyst stream wherein the oil is first discharged through an orifice onto an impact surface located within a mixing tube. The mixing tube delivers a cross-flow of steam which simultaneously contacts the liquid. The combined flow of oil and steam exits the conduit through an orifice which atomizes the feed into a dispersion of fine droplets and directs the dispersion into a stream of flowing catalyst particles. The injection devices of the '540 and '049 patents rely on relatively high fluid velocities and pressure drops to achieve atomization of the oil into fine droplets. Providing this higher pressure drop burdens the design and increases the cost of equipment such as pumps and exchangers that are typically used to supply liquid and gas to the feed injection device. The need to replace such equipment may greatly increase the cost of retrofitting an existing liquid-solid contacting installation with such an injection apparatus.

Another useful feature for dispersing feed in FCC units is the use of a lift gas to pre-accelerate the catalyst particles before contact with the feed. Modern FCC units use a pipe reactor in the form of a large, usually vertical, riser in which a gaseous medium upwardly transports the catalyst in a fluidized state. Catalyst particles first enter the riser with zero or negative velocity in the ultimate direction of riser flow. Initiating or changing the direction of particle flow creates turbulent conditions at the bottom of the riser. When feed is introduced into the bottom of the riser, the turbulence can cause mal-distribution and variation in the contact time between the catalyst and the feed. In order to obtain a more uniform dispersion, the catalyst particles are first contacted with a lift gas to initiate upward movement of the catalyst. The lift gas creates a catalyst pre-acceleration zone that moves the catalyst along the riser before it contacts the feed. After the catalyst is moving up the riser, it is contacted with the feed by injecting the feed into a downstream section of the riser. Injecting the feed into a flowing stream of catalyst avoids the turbulence and backmixing of particles and feed that occurs when the feed contacts the catalyst in the bottom of the riser. A good example of the use of lift gas in an FCC riser can be found in U.S. Pat. No. 4,479,870 (Hammershaimb et al).

There are additional references which show the use of a lift gas in non-catalytic systems. For example, in U.S. Pat. No. 4,427,538 (Bartholic), a gas which may be a light hydrocarbon is mixed with an inert solid at the bottom of a vertically confined conduit, and a heavy petroleum fraction is introduced at a point downstream so as to vary the residence time of the petroleum fraction in the conduit. Similarly, in U.S. Pat. No. 4,427,539 (Busch et al), a $C_4$-minus gas is used to accompany particles of little activity up a riser upstream of charged residual oil so as to aid in dispersing the oil.

The orientation of feed injection has also received attention. U.S. Pat. No. 5,139,748 (Lomas et al) shows the use of radially directed feed injection nozzles to introduce feed into an FCC riser. The nozzles are arranged in a circumferential band about the riser and inject feed toward the center of the riser. The nozzle arrangement and geometry of the riser maintain a substantially open riser cross-section over the feed injection and downstream riser sections. Feed atomization, lift gas, and radial injection of feed have been used to more uniformly disperse feed over the cross-section of a riser reaction zone. Nevertheless, as feed contacts the hot catalyst, cracking and volumetric expansion of the hydrocarbons causes an increase in the volumetric rate of fluids passing up the riser. A large portion of this volumetric increase occurs immediately downstream of the feed injection point. Previous feed distributors have allowed this volumetric expansion to occur in a relatively uncontrolled fashion. The uncontrolled volumetric expansion occurring simultaneously with mixing of catalyst and hydrocarbon feed results in mal-distribution that adversely effects the quantity and quality of the products obtained from the cracking reaction. This mal-distribution is caused by turbulent backmixing as well as quiescent zones in the riser section immediately downstream of the feed injection point.

A number of other references also disclose different arrangements for injecting feed radially into a transversely flowing stream of catalyst that is passing through a riser. These methods and apparatus have in common the use of a flow restriction or an orifice arrangement that can provide a venturi effect. Examples of such arrangements are shown in U.S. Pat. No. 5,358,632 (Hedrick), U.S. Pat. No. 5,338,438 (Demoulin et al), U.S. Pat. No. 5,205,992 (van Ommen et al), U.S. Pat. No. 5,552,119 (Holmes), and U.S. Pat. No. 5,562,818 (Hedrick). These patents all show the radial injection of feed immediately at or downstream of the choke point formed by the restriction or venturi orifice arrangement. These methods and apparatus have the advantage of eliminating, to some degree, turbulence associated with the injection of feed and the rapid expansion of the feed as it contacts the hot catalyst. All of these arrangements, however, suffer from at least one defect associated with their continued use in a commercial process. Some of the apparatus are complicated and difficult to fabricate or install. There is also the problem of maintenance of the apparatus for radially dispersing the flow. High particle velocities create a very erosive environment and are likely to cause rapid erosion of any unprotected metals surfaces and high erosion of surfaces even with abrasion resistant coverings. Therefore, use of such venturi arrangements will require designs that inherently protect the nozzles as well as allowing for easy replacement and maintenance of the apparatus. Finally, there is also the need to provide a system that is flexible and easily modified.

SUMMARY OF THE INVENTION

It is an object of this invention to provide a method and apparatus that simplifies the reducing or eliminating of non-uniformity in the mixing of particles and feed in the injection of feed into a transversely flowing particle stream. It is a further object of this invention to provide an apparatus and method for injecting feed across a restrict opening into a transverse flowing stream of catalyst. It is a further object of this invention to provide a method and apparatus that is susceptible to simple repair, replacement, or modification that provides an injection or feed across a confined or restricted opening into a transversely flowing stream of catalyst.

The objectives of this invention are achieved by a specific form of a feed injection arrangement that injects feed transversely from the sides of a restricted opening into a stream of flowing particles. The restricted opening is formed by opposing sides that extend as parallel chords on the sides of the riser or other downflow contacting conduit. The restricted opening is preferably formed to create an abrupt restriction that has a venturi effect on the particle stream as it passes into contact with the riser. The parallel sides may be built out with refractory lining or with metal baffles overlayed with abrasion resistant lining, or by parallel pipes that tangentially straddle opposite sides of the catalyst conduit. In more specific forms the invention can use horizontally extended pipes that are tangentially positioned apart from each other across a restricted opening of the conduit that transports the particles. The pipes horizontally inject the feed into the flowing particle stream. Such a pipe arrangement has the advantage of being easily inserted and withdrawn from the riser or other conduit to provide maintenance of the nozzles in the highly erosive environment of the restricted opening. Easy insertion or replacement of the feed pipes also facilitate modification of the nozzles to alter the fluid flow properties of the injected feed.

The restricted opening does provide a venturi effect and actually comprises a quasi-inverted venturi. It is a quasi venturi since it is shaped from gradually sloped, flat surfaces on two sides which alters the catalyst flow path from the typically round conduit cross-section to a confined rectangular orifice where the raw oil is injected. This arrangement has the further advantages of minimizing pressure drop and reducing abrasion at the inlet surface that directs the flow. The downstream outlet from the restricted opening is designed to permit rapid expansion of the hydrocarbon with minimum abrasion of the surfaces above the feed system.

Additional modified forms of the invention include specific configurations of the feed injection pipes. One arrangement of the feed injection pipes will inject a single stream which will usually be all oil. The feed injection pipe may have an arrangement that provides internal baffles for providing cooling of the outer pipe wall to prevent coking therein and an even distribution of the feed to all of the nozzles in both horizontally extended pipe injectors. The feed pipes may also be arranged to contain additional injection nozzles for combining a separate stream such as steam or other atomization medium together with the oil feed at the injection points.

Other mechanical and operational advantages can result from the incorporation of this invention. Such advantages include locating the feed injection closer to the point at which regenerated catalyst initially enters a riser or a downcomer conduit by relying on the restricted opening to provide the dispersion of the particulate material as it is contacted by feed. This eliminates the need for a long pre-acceleration zone to increase the velocity of the particles before it contacts the feed. Moving the feed injection point closer to the point of regenerated catalyst entry can reduce overall height for the process unit. A related process advantage associated with the distribution of particles to the restricted opening provides good catalyst distribution with a higher catalyst density below the initial feed entry point. Accordingly, higher densities reduce the amount of lift gas that may be needed to pre-accelerate catalyst. An additional mechanical advantage of the above arrangement follows from reduced clearance requirements for the piping on the external part of the riser or downcomer conduit as a result of supplying feed in two simple horizontal lines across the restricted opening. As a result, there is no need for complex piping to feed multiple feed distributors located around the circumference of the catalyst-conveying conduit.

Accordingly, in one embodiment, this invention is a method of mixing fluidized particles with an at least partially liquid feedstream comprising hydrocarbons. The method introduces fluidized particles into an upstream section of a particle transport conduit and passes the particles downstream through the transport conduit into a feed contacting zone having a reduced cross-sectional area. A pair of parallel solid chords extend inwardly from the sidewalls of the transport conduit to form the feed contacting zone. The process injects the feed into the particle stream at or immediately downstream of the chords and along a transverse distance that is substantially equal to the length of the chords. The mixture of feed and particles accelerates in a downstream direction in the transport conduit through an acceleration zone that has a continuously increasing cross-sectional area. The mixture of feed and particles passes from the acceleration zone into a section of the transport conduit having a uniform cross-sectional area for further reaction or separation of the feed in the presence of the particles.

In an apparatus embodiment, this invention comprises an elongated transport conduit having an upstream and a downstream end, means for adding fluidized particles to the upstream end, and means for recovering a mixture of particles and feed from the downstream end. Two opposing parallel chord members located transverse to the primary axis of the conduit and separating the upstream and downstream ends of the transport conduit extend inwardly from the sidewall of the transport conduit and tangentially across the transport conduit to define a restricted opening in the center of the conduit. A feed injection line at or adjacent to and parallel with each chord injects feed into the conduit from two sides over a length substantially equal to the length of the chord members.

Additional objections, embodiments, and details of this invention can be obtained from the following "detailed description".

DETAILED DESCRIPTION OF THE INVENTION

This invention can be used in combination with any type of particulate material. The material may be inert or reactive in the presence of the particular fluid material. A wide variety of inert and catalytic materials is suitable for this invention. For example, in destructive distillation processes, a suitable inert material comprises an alpha alumina. FCC applications of this process can include any of the well-known catalysts that are used in the art of fluidized catalytic cracking. These compositions include amorphous-clay type catalysts which have, for the most part, been replaced by high activity, crystalline alumina silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. Zeolite catalysts used in the process of this invention will preferably have a zeolite content of from 25–80 wt-% of the catalyst. The zeolites may also be stabilized with rare earth elements and contain from 0.1 to 10 wt-% of rare earths.

Suitable liquid media for this invention include any liquid stream that will enter the distribution arrangement at least partially as a liquid and is further vaporized by contact with the particulate material. Feed for the destructive distillation will use highly refractory crudes with boiling points that extend over wide ranges and high concentrations of metals and coke. For example, one typical crude has a boiling point that ranges from 240° to 1575° F. with more than half of the liquid volume boiling above 1000° F. For the FCC process, feedstocks suitable for processing by the method of this invention include conventional FCC feeds and higher boiling or residual feeds. The most common of the conventional feeds is a vacuum gas oil which is typically a hydrocarbon material having a boiling range of from 650° to 1025° F. and is prepared by vacuum fractionation of atmospheric residue. These fractions are generally low in coke precursors and the heavy metals which can deactivate the catalyst. Heavy or residual feeds, i.e., boiling above 930° F. and which have a high metals content, are also finding increased usage in FCC units.

When applied in catalyst operations, both the metals and coke serve to deactivate the catalyst by blocking active sites on the catalysts. Coke can be removed to a desired degree by regeneration and its deactivating effects overcome. Metals, however, accumulate on the catalyst and poison the catalyst. In addition, the metals promote undesirable cracking, thereby interfering with the reaction process. Thus, the presence of metals usually influences the regenerator operation, catalyst selectivity, catalyst activity, and the fresh catalyst makeup required to maintain constant activity. The contaminant metals include nickel, iron, and vanadium. In general, these metals affect selectivity in the direction of less gasoline, and more coke and dry gas. Due to these deleterious effects, the use of metal management procedures within or before the reaction zone are anticipated in processing heavy feeds by this invention.

This invention will be described in the context of an FCC process for the catalytic cracking of hydrocarbons by contact with a fluidized catalyst. The description of this invention in the context of a single process is not meant to impose any limitations on the scope of the appended claims. In addition, for convenience, the invention is described in the context of an upflow riser. Such description is not meant to limit the invention to such configuration or to exclude its applicability to other transport conduit arrangements such as a downflow contacting conduit.

Figure 1:
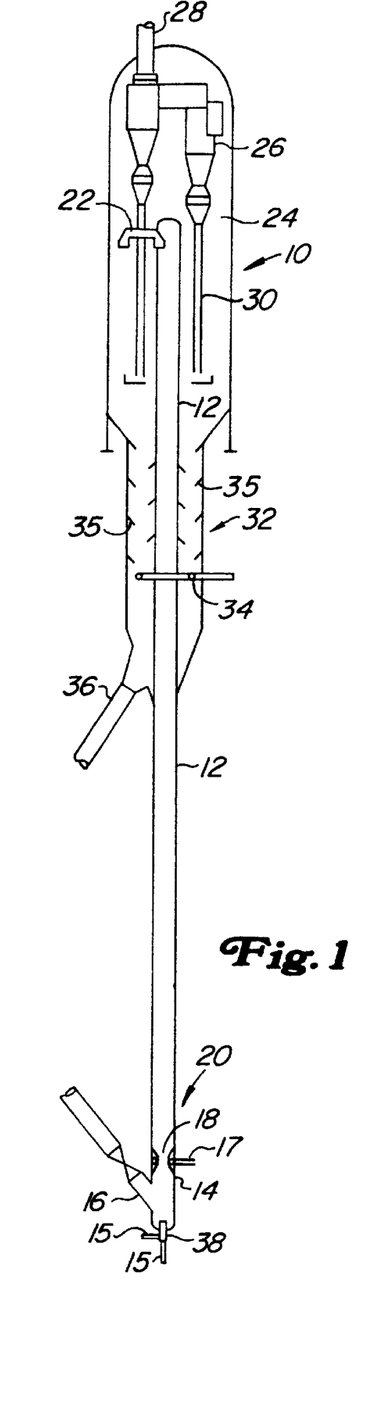
FIG. 1 is a sectional elevation of an FCC reactor and riser.

In a typical FCC process flow, finely divided regenerated catalyst leaves a regeneration zone and contacts a feedstock in a lower portion of a reactor riser zone. FIG. 1 shows a reactor 10 with a vertical riser 20 having an upper section 12 and a lower riser portion 14 into which a regenerator standpipe 16 transfers catalyst from the regenerator (not shown). Fluidization or lift gas may be added to the riser through the lines 15. Feed enters the riser through conduit 17 and a feed injection arrangement 18. While the resulting mixture, which usually has a temperature of from about 200° C. to about 700° C., passes up through the riser, conversion of the feed to lighter products occurs and coke is deposited on the catalyst. The effluent from the riser is discharged from the top of the riser through a disengaging arm 22 into a disengaging space 24 where additional conversion can take place. The hydrocarbon vapors, containing entrained catalyst, are then passed through one or more cyclone separators 26 to separate any spent catalyst from the hydrocarbon vapor stream. The separated hydrocarbon vapor stream is passed from an outlet nozzle 28 into a fractionation zone (not shown) known in the art as the main column wherein the hydrocarbon effluent is separated into such typical fractions as light gases and gasoline, light cycle oil, heavy cycle oil, and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process, may be recovered as final product streams. The separated spent catalyst from cyclones 26 passes into the lower portion of the disengaging space through diplegs 30 and eventually leaves that zone passing through a stripping zone 32 in which a stripping gas, usually steam, enters a lower portion of zone 32 through a distributor ring 34 and contacts the spent catalyst purging adsorbed and interstitial hydrocarbons from the catalyst. A series of baffles 35 in the stripping zone improves contact between the catalyst and stripping gas. The spent catalyst containing coke leaves the stripping zone through a reactor conduit 36 and passes into the regeneration zone where, in the presence of fresh regeneration gas and at a temperature of from about 620° to about 760° C., combustion of coke produces regenerated catalyst and flue gas containing carbon monoxide, carbon dioxide, water, nitrogen, and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone and, as previously mentioned, contacts the feedstock in the reaction zone.

Figure 2:
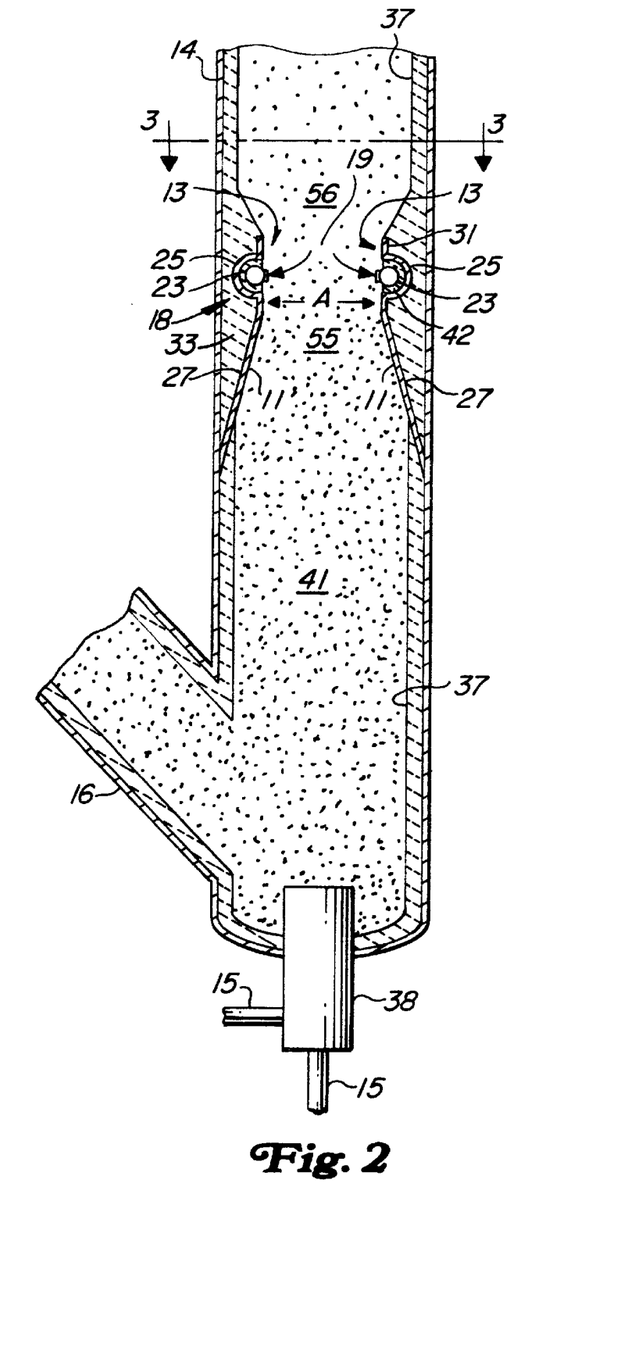
FIG. 2 is an enlarged section of the lower end of the riser shown in FIG. 1.

Catalyst entering the lower section 14 of the riser conduit first forms a dense catalyst bed. FIG. 2 more clearly shows the detail of the bottom section 14 of the riser conduit. A fluidizing medium enters the bottom of the riser through either of lines 15 and nozzle 38 and contacts the catalyst entering through line 16 to form a dense bed 41. The term "dense bed" refers to a region of catalyst having a density of at least 15 lbs/ft$^3$ and more preferably at least 20 lbs/ft$^3$. The dense bed zone preferably comprises a bubbling bed which provides good mixing of the catalyst and a uniform suspension of catalyst around the injection arrangement 18.

This invention does not require a specific gas composition for the fluidizing medium. Steam can serve as a suitable fluidizing medium. The fluidizing medium can also comprise a typical lift gas and can be used by itself or in combination with steam. Lift gas typically includes not more than 10 mol-% of $C_3$ and heavier hydrocarbons. In addition to hydrocarbons, other reaction species may be present in or comprise the fluidizing mediums such as $H_2$, $H_2S$, $N_2$, CO, and/or $CO_2$.

Whatever type of fluidizing medium is used in the dense bed, the low gas velocity through the dense bed zone requires very little fluidizing medium. Thus, in addition to the dense bed conditions providing good distribution of the catalyst up to feed injection arrangement 18, it also minimizes the amount of fluidizing medium needed prior to the injection of the feed. The quantity of fluidizing gas entering the bottom of the riser creates a low upward velocity of catalyst preferably having a velocity of less than 6 ft/sec and usually in a range of from 3 to 5 ft/sec. Preferably, the gas velocity through the bed is kept very low, in most cases at a rate of 2 ft/sec or less. In the case of steam, the fluidizing medium will in most cases range between 0.2 and 0.5 wt-%. Such low fluidizing medium rates represent a ten-fold decrease over that currently used in feed distributors. Nevertheless, the low gas flow is sufficient to maintain the dense bubbling bed conditions throughout the volume of catalyst located below the feed injection arrangement 18.

An essential element of this invention is the geometry of feed injection arrangement 18, particularly the elements forming the feed injection arrangement. Looking then at FIG. 2, as the catalyst passes upwardly in the dense bed, sloped sidewalls 11 restrict the diameter of the riser and create maximum contraction points 13 that border, on opposite sides, a restricted opening 19. A relatively small diameter or width across the restricted opening is an important feature of this invention. The width of the rectangular annular feed and contact zone is shown by a dimension A. Preferably, the zone will have a width that reduces the open area of restricted opening 19 to less than 80% of the open area across dense bed 41, and more preferably an open area across restricted opening 19 that is less than the 60% of the open area across dense bed 41. In terms of actual size, dimension A will usually have a width of less than 48 inches, preferably, the zone will have a width of less than 24 inches, and more preferably, the zone will have a width of less than 12 inches. The narrow transverse width of the feed injection arrangement insures good contact of the feed with the catalyst by allowing the feed to penetrate all or substantially all of the transverse width of the passing catalyst. The feed is injected into the catalyst contact zone transversely across the restricted opening 19 from a plurality of linearly arranged nozzles 21 as shown more clearly in FIG. 3. A pair of slotted pipes 25 each house one in a pair of distribution pipes 23 that supply feed to nozzles 21.

Figures 3, 4, 5, 6:
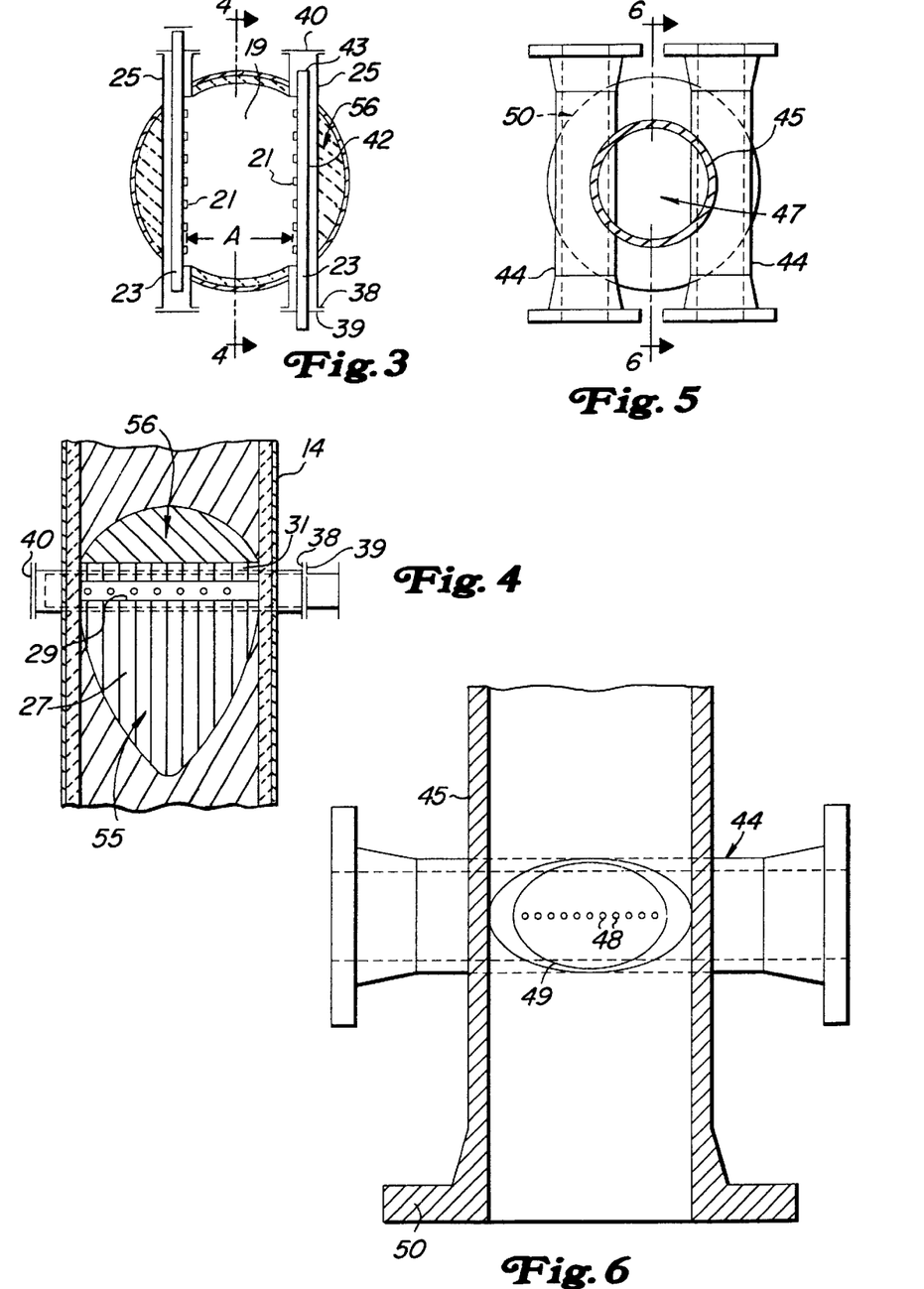
FIG. 3 is a transverse view of the riser taken at section 3—3 of FIG. 2.
FIG. 4 is a section of the riser taken at lines 4—4 of FIG. 3.
FIG. 5 is a modified arrangement similar to that shown in FIG. 3.
FIG. 6 is a section of the riser taken at line 6—6 to that shown in FIG. 5.

Nozzles 21 define orifice openings sized to discharge a fluid at a velocity in a range of about 6 to 50 ft/sec. The preferred sizes for the orifice openings are in a range of from ¼-inch to 1 inch in diameter. The orifice openings are spaced apart usually by at least one orifice diameter. A preferred pattern for the orifice openings uses ¼-inch openings on about 1-inch centers. The width of dimension A across the restricted opening, the pressure drop through orifice openings 21, and the size of the orifice openings 21 are interdependent. Typically, in the case of a ¼-inch opening, the number of openings is selected to provide a velocity of oil through the holes of about 10 ft/sec. Small holes are preferred since they maximize the number of openings and provide a greater continuous flow area about the restricted opening 19. It is also possible in this invention to stack more than one distributor pipe to provide additional rows of nozzles on each side of the restricted opening 19 where necessary to provide a desired small opening size. However, the smaller size of the orifice openings must be correlated with the reduced jet length upon which feed will be injected across dimension A. Therefore, as dimension A increases, it is typically necessary to increase the orifice opening size to provide a greater jet projection across the opening. Increase in pressure drop alone will ordinarily not produce a sufficient increase in the jet length since the added pressure drop will serve to further atomize the oil and reduce its effective penetration. Those skilled in the art can size different combinations of openings in width A that will provide good feed contact across the entire width of the restricted opening. In addition, other arrangements for distributing the feed can include narrow slots from which the feed is transversely injected from distributor pipe 23 into the passing catalyst stream.

It is possible to form the orifice openings in a number of ways. An elongated slot may be used. The simplest way of forming the opening is by simply punching holes into the plates used to distribute the feed adjacent to the contraction points 13. Alternately, the orifice openings may be defined by nozzles welded into or onto the central feed distributor and any other location from which feed is injected. A flush location for the orifices or nozzles minimizes the possibility of flowing catalyst producing erosion on these elements. In general, flow-induced catalyst erosion should not pose significant problems for the arrangement of this invention since the nozzles defining the orifices may be kept back from the direct flow path of the catalyst.

The feed is normally introduced at or immediately upstream or downstream of the contraction point 13. Preferably, the feed is injected at the maximum contraction point. "Immediately upstream or downstream" generally means that feed is injected from a point located upstream or downstream of the contraction point that does not exceed the distance A, preferably does not exceed one-half of the distance A, and more preferably does not exceed one-quarter of the distance A.

The angle at which the centerlines of the orifices defined by nozzles 21 are aimed can be varied. While it is essential that the orifices impart a transverse velocity to the exiting feed, the stream discharged by the orifices can also have a vertical component of velocity. For this reason, the centerlines of the orifices will usually make an approximately right angle with the centerline of the riser. However, it is not necessary that the orifice centerlines be kept completely perpendicular to the centerline of the riser. When varied, the centerlines will ordinarily deviate by an angle of up to 25° with a plane perpendicular to the centerline of the riser. But preferably, the angle of the orifice centerlines deviates from such plane by an angle of less than 10° and more preferably less than 5°.

The design of the nozzle end or orifice opening can also contribute to the effective functioning of this invention. Production of a relatively small spray pattern from the end of the nozzle aids in dispersing feed mixture across the entire cross-section of the narrow diameter feed and catalyst contact zone. Therefore, the ends of the nozzle may have a restricted discharge opening in the form of a nozzle or slot that will spray the feed in a narrow pattern. Preferably, the total angle of this pattern in the vertical direction does not exceed 45° and more preferably it does not exceed 20°. Custom nozzles or spray tips may be used to create desired flow patterns and atomization out of the nozzles 21. When custom nozzles are used to enhance a spray pattern, they are preferably located flush or slightly behind the maximum contraction point 13 to protect the nozzles from erosion.

Following mixing, contact of the feed with the hot catalyst creates a volumetric expansion from both the vaporization of liquid hydrocarbons and heating of the vapor as well as cracking of the hydrocarbons into lower molecular weight species. An important advantage of this invention can be controlling the rate of variation in the cross-sectional area of the conduit as feed and catalyst flow downstream of the catalyst and feed mixing zone. This control provides a gradual and continuous increase in the flowing cross-section area for the catalyst and feed mixture. Gradually increasing the flowing cross-sectional area prevents abrupt changes in the velocity of the stream and the resulting turbulence or quiescent zones that introduces variations in the feed and catalyst contact time, thereby preventing uniform catalyst and feed contacting. Formation of the sidewalls of the riser 14 to a desired profile can provide the desired flow profile.

Referring again to FIGS. 2–4, the zone immediately downstream of the contraction point 13 is indicated by numeral 56 and termed an "expansion zone". The term "expansion zone" refers to the function of this zone to control the acceleration of the catalyst under the expansion of the gases with the objective of providing a more constant velocity of the catalyst and feed mixture through the expansion zone. The expansion zone passes the catalyst and feed mixture into a section of the downstream conduit or riser having a uniform cross-section. A uniform cross-sectional area for the conduit downstream of the expansion comprises at least a short section of riser wherein the cross-section area does not significantly change.

Immediately upstream of the contraction point 13, a zone termed the "contraction zone" is indicated by numeral 55. Suitable geometries for the contraction zone and expansion zone will provide tapered sections that continuously decrease the cross-section of the catalyst flow path and then increase the cross-section of the catalyst and feed mixture from the minimum diameter of the catalyst feed contact zone to the full diameter of the riser. The tapered sections should provide a smooth profile without any abrupt discontinuities that would promote turbulence or quiescent regions in the acceleration zone. Nevertheless, the tapered sections may provide a linearly or non-linearly increasing flow area. However, a linearly increasing flow area is believed to most effectively control the acceleration of the gas and catalyst stream through the expansion zone. As shown in FIG. 2, the length of the expansion zone relative to the contraction zone may differ and the deceleration zone may be longer or shorter than the contraction zone.

The expansion zone has a length that will provide sufficient residence time for the expansion of gases to stabilize. A minimum residence time of about 0.05 seconds is required in the expansion zone. Preferably, the expansion zone will provide a residence time for the catalyst and gas mixture of from 0.05 to 0.2 seconds. Preferably, the feed and catalyst mixture will flow through the expansion zone and into the full riser diameter approximately 0.1 to 0.15 seconds after feed injection. The expansion zone must also be sized to accommodate substantial gas and catalyst flow velocities through the expansion zone. As the catalyst leaves the restrictive flow area of the feed and catalyst contact zone, it is immediately accelerated to about 35 to 40 ft/sec as the reaction begins. Catalyst and gas velocity through the expansion zone will usually range from 40 to 65 ft/sec. Therefore, for the most effective flow transition, the expansion zone will often have a length of from 3 to 8 feet. The smooth sidewalls and tapered section of the expansion zone will usually impose a pressure drop of less than 1 psi and more preferably of less than 0.1 psi on the catalyst stream as it flows up the riser.

The desired shape of the restricted opening 19 with the transitions provided by the contraction zone and expansion zone may be provided in a variety of methods. FIG. 2 shows a metal baffle plate 27 having an angled surface that transitions the principally linear chord defined at contraction point 13 to the curvature of the riser. Metal plate 27 will typically be of a light gauge of a ½-inch or less and will have a covering of relatively thin, abrasion-resistant lining to protect the metal surface from erosion. The metal plate 27 will typically extend up to a slotted opening 29 defined by slotted pipe 25. An additional extension plate 31 will extend upwardly from the slotted opening 29 to provide an additional metallic surface area for location of an additional abrasion-resistant lining. The volume 33 defined behind metal baffle 27 is filled with an insulated lining that is usually cast in place to protect the outer wall of riser 14 from the high internal temperatures. The lining behind baffle 27 is typically the same as the lining 37 that covers the internal portions of riser 14 and is held in place by suitable anchors. The lining above contraction points 13 and extension plate 31 are formed with the refractory lining to provide the tapered surface of expansion zone 56 that is blended to transition from the straight chord defined by contraction point 13 to the curvature of the riser wall. Sloped portions of contraction zone 55 and expansion zone 56 may also be formed without metallic sleeve 27 from suitable abrasion-resistant linings that can be cast in place to any desired shape.

In the forming of contraction point 13, the slotted pipe 25 serves as a form for providing a transverse pocket 42 for retaining the distribution pipe 23. The transverse pocket may be formed without the slotted pipe 25 by suitable molding in the refractory lining. However, the use of slotted pipe 25 is preferred since it facilitates the installation of the lining and also serves as further protection for the distribution pipe 23. Slotted pipe 25 is shown as having a flange 38 that receives a retaining flange 39 of distribution pipe 23. Retaining flange 39 holds distribution pipe 38 in position within slotted pipe 25. An additional blind flange 40 is preferably provided at the opposite end of slotted pipe 25 to facilitate removal of distribution pipe 23 after its use in service. As a further protection against erosion, any gap in pocket 42 between slotted pipe 25 and distribution pipe 23 may be filled with ceramic fiber blanket or other such material. The end of slotted pipe 25 adjacent blind flange 40 may also contain an appropriate retaining device to support the end 43 of distribution pipe against movement or vibration while in service. The ceramic fiber packing in the annular area 42 also serves to reduce vibration and support distribution pipe 23 while in service.

As shown by FIG. 5, slotted pipe 25 and distribution pipe 23 are not necessary to provide the restricted opening of this invention. In a simpler version of the invention, two parallel pipes 44 tangentially intersect a riser 45 to define a restricted opening 47. Feed piping may be connected directly to pipes 44 for distribution of feed through a series of orifice openings 48 as shown in FIG. 6. FIG. 6 also shows the elliptical opening 49 formed by the tangential intersection of pipe 44 with sidewall of riser 45. The orifice openings 48 are defined directly as a line along the inner most surface of pipes 44. FIGS. 5 and 6 also show a flanged connection 50 at the bottom riser section 45 for removal or insertion of an entire riser section with the pipes 44 when they require replacement or modification.

Figure 7:
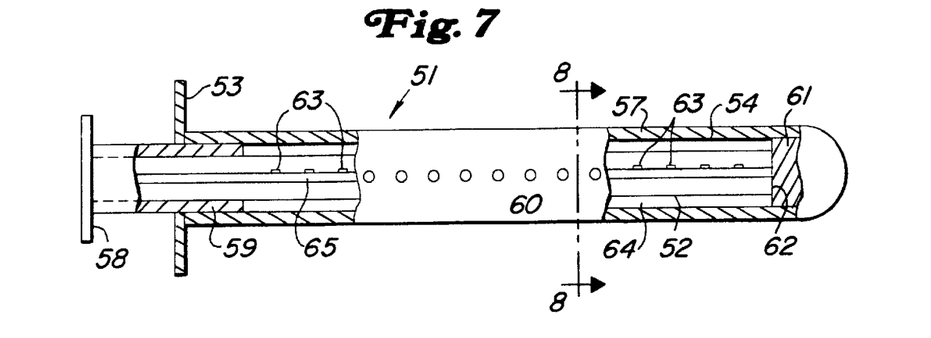
FIG. 7 is a partial section of a distribution pipe.
Figure 8:
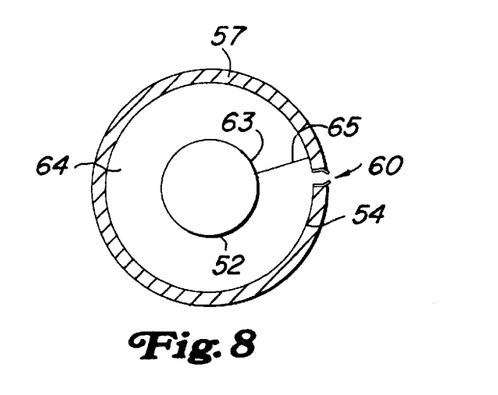
FIG. 8 is a section of the distribution pipe of FIG. 7 taken at lines 8—8.

The preferred form of this invention is to use an inserted distribution pipe such as that shown in FIGS. 2, 3, and 4. A typical insertable distribution pipe 51 is shown in more detail in FIG. 7. A suitable distribution pipe can consist of a simple pipe lance with holes formed along a line in one side of the pipe. FIG. 7 shows the use of an internal distributor pipe 52 that extends through an outer connection flange 53 and is surrounded by an outer pipe 54 that is covered with abrasion-resistant lining 57. Feed enters the internal distribution pipe through a flanged inlet 58. The annular space immediately outside of internal distribution pipe 52, near inlet flange 58, is filled with a suitable filler material 59 to displace any fluid flow into the annular section downstream of filler material 59. Distribution pipe 52 defines a series of orifice openings 60 that extend in a straight line. At the opposite end of distribution pipe 52, pipe 54 is supported from a plate 62 and again filled with a suitable filler material 61 to prevent the entry of fluid therein.

The arrangement of inner distribution pipe 52 and outer pipe 54 are arranged to provide a uniform distribution of feed to all of orifices 60 while also providing cooling to the outer surface of pipe 54 to prevent coking therein. Therefore, the feed first enters the central portion of pipe 52 and is discharged at regular intervals through a series of orifices 63 defined in the sidewall thereof. As the feed fluid passes out of orifice 63, it passes around the annular area 64 until it is discharged through orifices 60. The initial distribution of the feed through the inner conduit 52 uniformly distributes the feed across the entire length of the distribution pipe. The relatively cool feed then flows into contact with the inner surface of conduit 54 over its entire circumference in a closed loop path 64 defined by baffle 65. The cooling effect is promoted by the entering feedstream that usually has a temperature below its initial boiling point, but a temperature well below the temperature of the hot catalyst that it contacts.

Figure 9:
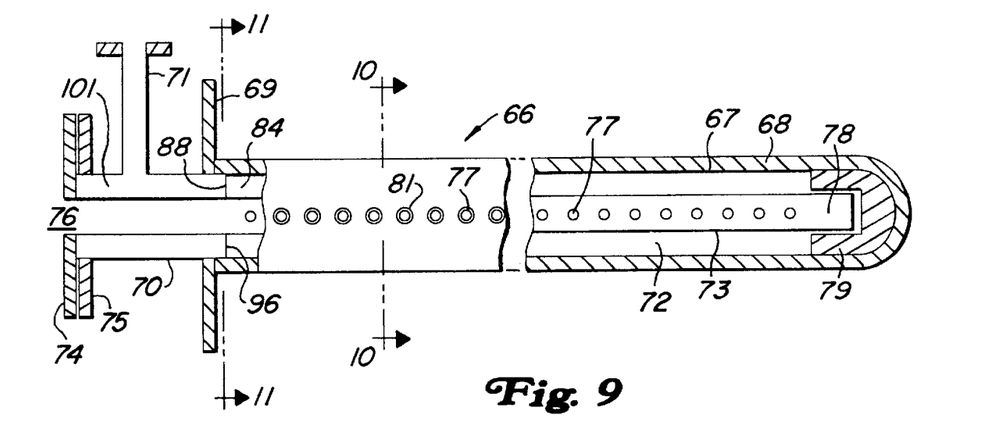
FIG. 9 is a section of a distribution pipe for injecting two fluids.
Figure 10:
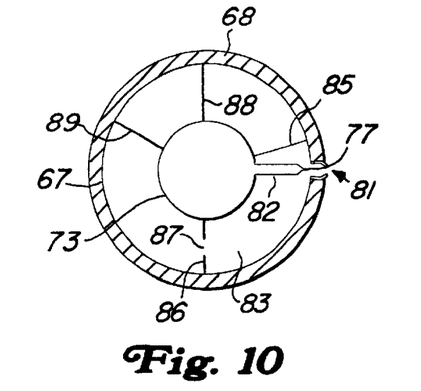
FIG. 10 is a section of the distribution pipe of FIG. 9 taken across lines 10—10.

In many applications, a minimum quantity of some gaseous material will be mixed with the liquid feed that is injected into the flowing stream of catalyst. The gaseous medium usually serves to increase the atomization of the feed and to break the liquid into smaller droplets. A minimum quantity of such gaseous material that is usually used equals about 0.2 wt-% of the combined liquid and gaseous mixture. This invention may also benefit from the passing of an atomization gas separate from the feed into injection arrangement 18. Preferred distribution pipe arrangements for injecting both feed and a gaseous medium into the flow stream of catalyst are shown in FIGS. 9–13. FIG. 9 shows a distribution pipe arrangement 66 having an outer pipe 67 covered with refractory lining 68. A flange 69 encircles a proximate end 70 of pipe 67 that retains a transverse nozzle 71. Nozzle 71 can inject a fluid into the annular space 72 defined between the inside of outer pipe 67 and an inner distribution pipe 73. Inner distribution pipe 73 has a flange 74 connected to one end which is fixed to a flange 75 that surrounds proximate end 70 of pipe 67. A filler piece 79 retains an end 78 of inner distribution pipe 73.

One of the fluids to be mixed flows into inner distribution pipe 73 from inlet 76 and is discharged through the distribution pipe through inner orifices 77. The second fluid enters an annular space 101 between distribution pipes 67 and 73 through nozzle 71 and flows out of the space through outer orifices 81. As shown more clearly in FIG. 10, inner orifices 77 are arranged at the end of an extended nozzle 82 that injects the fluid traveling through inner pipe 67 directly in front of outer orifice 81. The feed or atomization fluid may flow through either of the fluid flow channels defined by the distributor of FIG. 9. Preferably, feed will flow through the inner distribution pipe 73 and the inner orifices 77 with steam flowing though the outer annular passage. The two fluids are combined as they exit outer orifice 81 and may undergo additional secondary mixing in dispersion chamber 83 formed by a partitioned section of annular space defined by baffles 85 and 86. The orifices 87 defined by baffle 86 control the entry of the fluid from the outer annular area into dispersion chamber 83. Additional baffles 88 and 89 may provide additional chambers for further control and regulation of fluid through the outer annular area 84 to obtain a uniform distribution of the fluid passing thereto along dispersion chamber 83.

Figure 11:
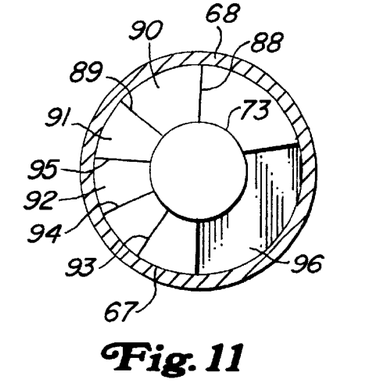
FIG. 11 is a section of the distribution pipe of FIG. 9 taken across lines 11—11.

As shown more clearly in FIG. 11, annular space 72 may be divided into a number of longitudinal passages as representatively shown by reference numerals 90, 91, and 92 and formed by baffles 88, 89, 94, and 95. Each longitudinal passage extends over an exceedingly more limited length of annular area 72 to channel flow more evenly over the full length of distribution pipe 67. Therefore, baffle sections 93, 94, and 95 will start at proximate end 70 of pipe 67 and have succeedingly shorter lengths to channel additional flow to the farthest ends of pipe 67. A plate 96 extends circumferentially around the inlet of dispersion chamber 93 to control fluid flow from nozzle 71. The volume defined by annular space 101 between flange 74 and the start of longitudinal baffle 96 distributes the fluid to the entrance of the channels defined by the baffles.

Figure 12:
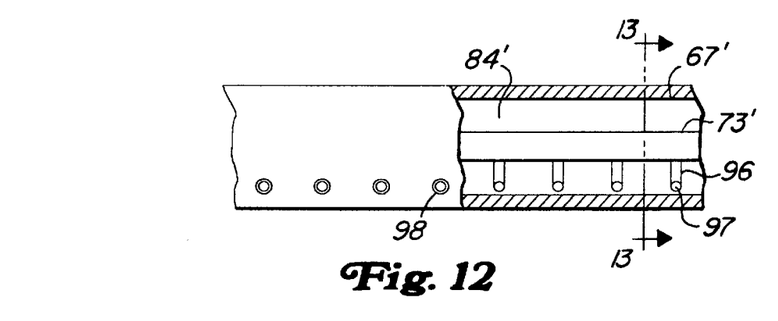
FIG. 12 is a partial section showing a modified form of the distribution pipe of FIG. 9.
Figure 13:
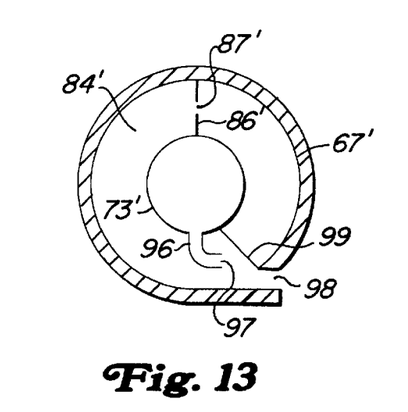
FIG. 13 is a section of the distribution pipe of FIG. 12 taken at lines 13—13.

A modified arrangement for mixing two fluids and distributing the fluids out of a distribution pipe is shown in FIGS. 12 and 13. The method of injecting fluid depicted by FIGS. 12 and 13 again show an annular space 84' defined by an inner distribution pipe 73' and an outer distribution pipe 67' covered by a refractory lining. Annular space 84' distributes a fluid around the outside of inner distribution pipe 73' and a plurality of extended nozzles 96 that define inner orifice openings 97. Inner orifice openings 97 discharge one fluid immediately upstream of an outer discharge nozzles 98. Annular chamber 84' is partitioned by a partition 99 to direct fluid around and into contact with the circumference of outer distribution pipe 67'. Another baffle 86' defines an orifice 87' that regulates the flow of fluid circumferentially through annular chamber 84' and directs the fluid into contact with fluid exiting nozzle 96 through orifice 97. Again, this arrangement may be used with either feed or gas passing through either passageway. However,it is again preferred that steam or other gaseous medium pass through the inner conduit 73' and contact the feed such as oil as it is discharged through outer nozzle 98.

What is claimed is:

1. An apparatus for contacting fluidized particles with an at least partially liquid feedstock, said apparatus comprising:
   a) an elongated transport conduit having an upstream and a downstream end;
   b) means for adding fluidized particles to the upstream end;
   c) two opposing parallel chord members located transverse to the primary axis of the conduit and separating the upstream and downstream ends of the transport conduit, the chord members extending inwardly from the inner sidewall of the transport conduit and across the transport conduit and defining a restricted opening in the center of the transport conduit;
   d) a feed injection line at or adjacent to and parallel with each chord member for injecting feed into the conduit from two sides over a length substantially equal to a length of the chord members; and
   e) means for recovering a mixture of catalyst and feed from the downstream end of the conduit.

2. The apparatus of claim 1 wherein a plurality of inwardly directed feed injection orifices are located along the chord members.

3. The apparatus of claim 2 wherein said feed injection orifices have a diameter of ¼-inch.

4. The apparatus of claim 1 wherein the distance between the chord members is not greater than 24 inches.

5. The apparatus of claim 1 wherein the chord members are comprised at least in part by a refractory lining that slopes outwardly from the wall of the transport conduit to form smooth sloped surfaces on the upstream and downstream sides of the restricted opening.

6. The apparatus of claim 5 wherein the upstream sloped surface is longer than the downstream sloped surface.

7. The apparatus of claim 1 wherein the innermost portion of the chord members is defined by two parallel pipes.

8. The apparatus of claim 1 wherein the innermost portion of the chord members is defined by a pipe housing having a longitudinally extended slot that is adapted to receive a distribution pipe having exit nozzles spaced along its length to provide said line of feed injection outwardly through the slot.

9. The apparatus of claim 8 wherein said distribution pipe contains a baffle for circulating entering feed around the inner periphery of the distribution pipe before discharge through the nozzles.

10. The apparatus of claim 8 wherein internal nozzles located within said distribution pipe are located to combine the feed and an atomization fluid immediately upstream of the exit nozzles.

11. The apparatus of claim 1 wherein said elongated transport conduit is a vertically extended riser.

12. An apparatus for contacting fluid catalyst with an at least partially liquid feedstock, said apparatus comprising:
   a) an elongated transport conduit having an upstream and a downstream end;
   b) means for adding fluidized catalyst to the upstream end;
   c) two opposing parallel chord members defined at least in part by slotted pipes located transverse to the primary axis of the conduit and separating the upstream and downstream ends of the transport conduit, the slotted pipes extending inwardly from the inner sidewall of the transport conduit across the transport conduit and defining a restricted opening in the center of the transport conduit into which the slot is directed;
   d) a distribution pipe extending through each slotted pipe having exit nozzles spaced along its length to provide a line of feed injection outwardly through the slot along the restricted opening; and
   e) means for recovering a mixture of catalyst and feed from the downstream end of the conduit.

* * * * *